Jan. 24, 1967   R. LUCAS   3,299,616
MOLECULAR SEPARATION OF GASEOUS MIXTURES
Filed March 11, 1964   3 Sheets-Sheet 1
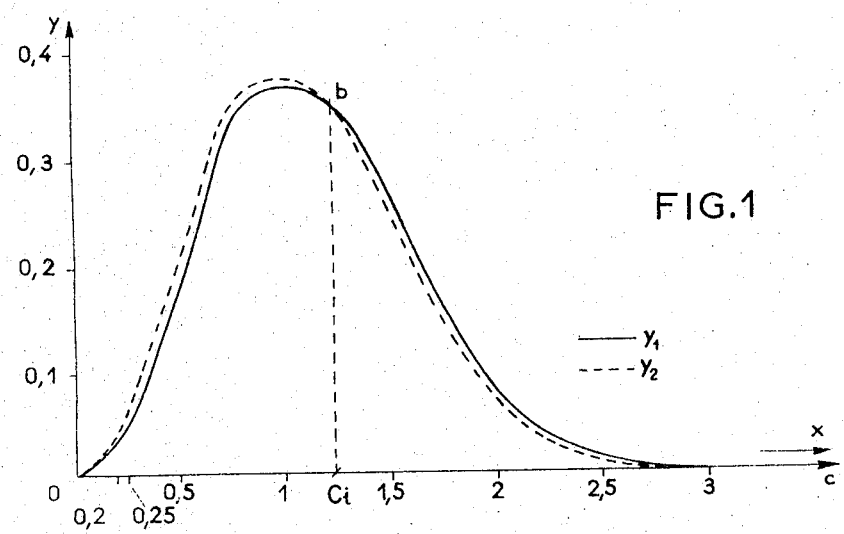
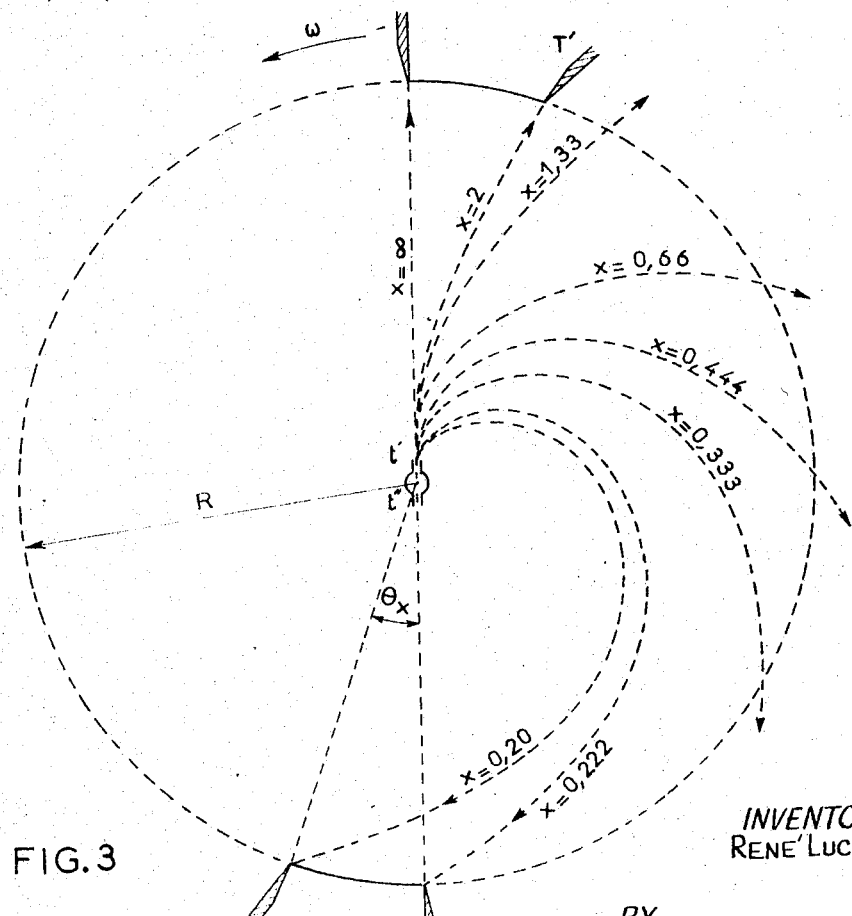
INVENTOR
RENÉ LUCAS,
BY
ATTORNEYS Jan. 24, 1967     R. LUCAS     3,299,616
MOLECULAR SEPARATION OF GASEOUS MIXTURES
Filed March 11, 1964     3 Sheets-Sheet 2
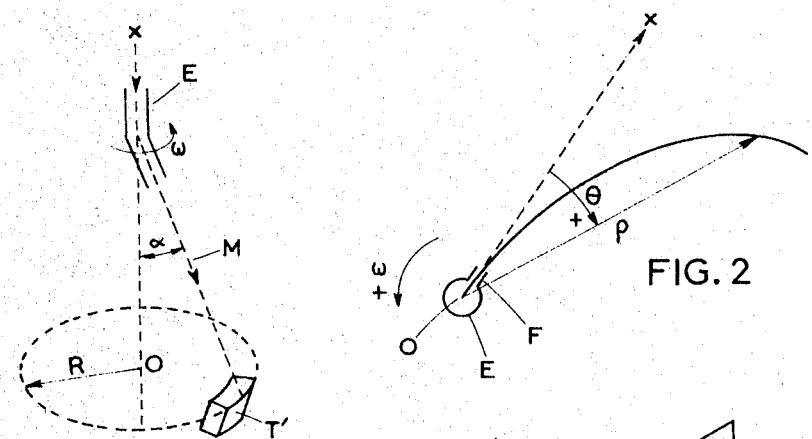
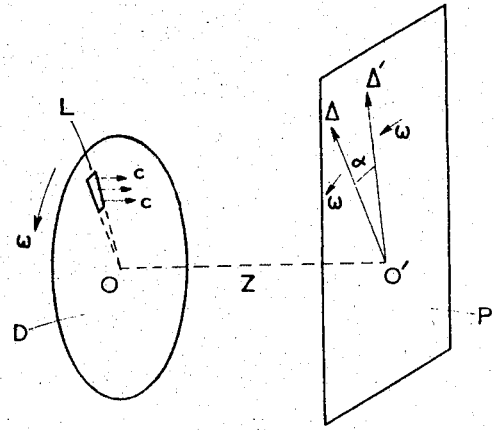
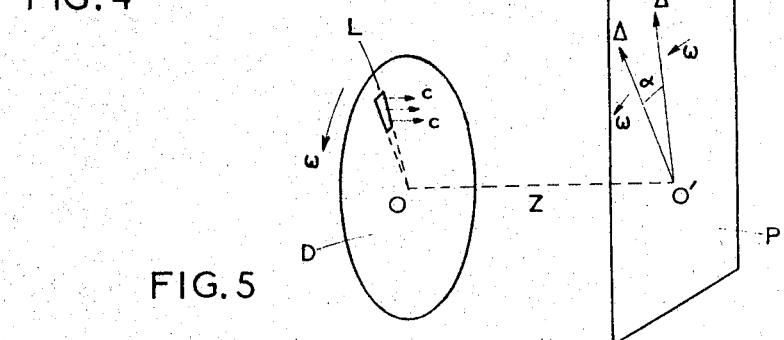
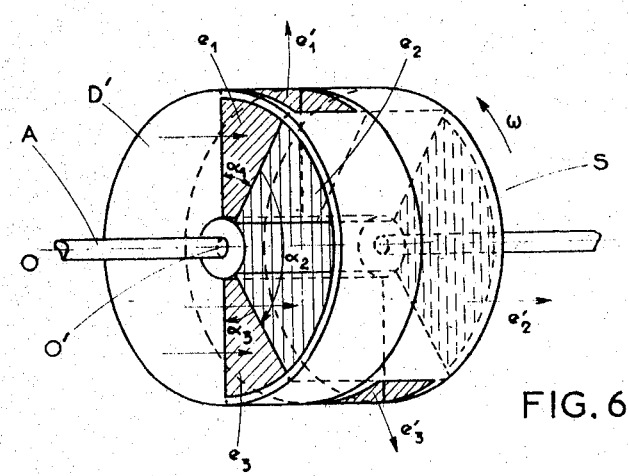
INVENTOR
RENÉ LUCAS,
ATTORNEYS

3,299,616
MOLECULAR SEPARATION OF GASEOUS MIXTURES

René Lucas, Paris, France, assignor to Etablissement Public: Centre National de la Recherche Scientifique, Paris, France, a corporation of France
Filed Mar. 11, 1964, Ser. No. 351,155
Claims priority, application France, Mar. 14, 1963, 927,982
6 Claims. (Cl. 55—17)

The present invention relates to the separation of a mixture of molecules of different weights in gaseous or vapour state.

The process of the invention consists in subjecting the molecules of a gaseous mixture, in thermodynamic equilibrium, according to the categories of their thermal agitation translation speeds, to a classification thereof whereby said mixture is caused to form at least one mobile molecular jet wherein the molecular speeds are distributed according to Maxwell's distribution law, and in trapping the mixture fractions the molecules of which assume speeds comprised in a predetermined interval.

The compositions of the selected fractions differ from those of the initial mixture and may be fractionated again in order to achieve a more complete separation of the mixture constituents.

The molecules of the initial mixture and of the separated fractions are advantageously brought to temperatures such that the vapour pressures are lower than the residual pressure, so as to minimize the pumping operations.

The mobile molecular jet may be produced by means of a nozzle member having a slot-shaped opening, and which, undergoing an angular rotational movement about an axis parallel to the longest side of the slot, scatters the outgoing molecules in planes perpendicular to said axis of rotation.

The axis of the jet may be perpendicular to the axis of rotation or form an angle therewith.

According to a preferred embodiment of the invention, the mobile molecular jet may also be obtained by means of a first rotary disc member provide with at least one opening bounded by two closely adjacent radii of said member, the gaseous molecules having a speed perpendicular to the plane of the disc moving along a plane passing through the axis thereof and reaching a second rotary disc member parallel to the plane of the first disc member, centered on the same axis, and spaced a certain distance therefrom, said second disc member being provided with segment-shaped openings limited by radii of the said second disc forming an angle proportional to the rotation speed of the discs and to the distance separating the same, and inversely proportional to the speed of the molecules, whereby the molecular composition of the gaseous mixture trapped by said openings are enriched with respect to the initial mixture, in molecules having a predetermined weight.

The recovered molecule mixtures may be recycled so that the mixtures obtained thereby will have only the desired enrichment factor.

According to a preferred embodiment, a device for carrying out the abovementioned process comprises a supply tank for an ejection nozzle adapted to spray the gaseous mixture into an enclosure including, on one hand, a first rotary disc formed with at least one segment-shaped slot through which pass the gaseous molecules, and on the other hand, a receiver disc rotating at the same speed as the said first disc and provided with segment shaped openings, said openings communicating, through ducts provided in a cylindrical selector drum integral with the disc, with discharge openings formed in the cylindrical wall and the bottom of said drum, said openings leading into chambers connected, through suitably arranged conduits, with containers adapted to receive the selected molecules.

According to an improved embodiment of this device, a stationary conveyor drum is arranged upstream of the slotted rotary disc, said drum consisting of ducts defined by coaxial cylindrical surfaces and by planes passing through the axis thereof, the cross section of said ducts being small with respect to their lengths, so that the molecular jets are guided along controlled paths, avoiding the molecules to be bodily carried along by the disc, in the space preceding said disc in the direction of movement of the molecules.

The invention will now be further described in more details, with reference to the appended drawings, wherein:

FIGURE 1 is a set of curves illustrating the relative number of molecules in a given mixture, the translation speeds of which are comprised between given limits.

FIGURE 2 is a diagrammatic representation of a method for separating the molecules by means of a rotating nozzle.

FIGURE 3 illustrates the plane distribution of the trajectories of the molecules obtained by means of a rotating nozzle.

FIGURE 4 is a diagrammatical representation of an alternative method for separating the molecules by means of a rotary nozzle having an inclined axis of emission;

FIGURE 5 is a diagrammatical representation of a method for separating the molecules by means of a slotted disc assembly;

FIGURES 6 and 7 illustrate diagrammatically an embodiment of device for carrying out the above method.

Figure 7:
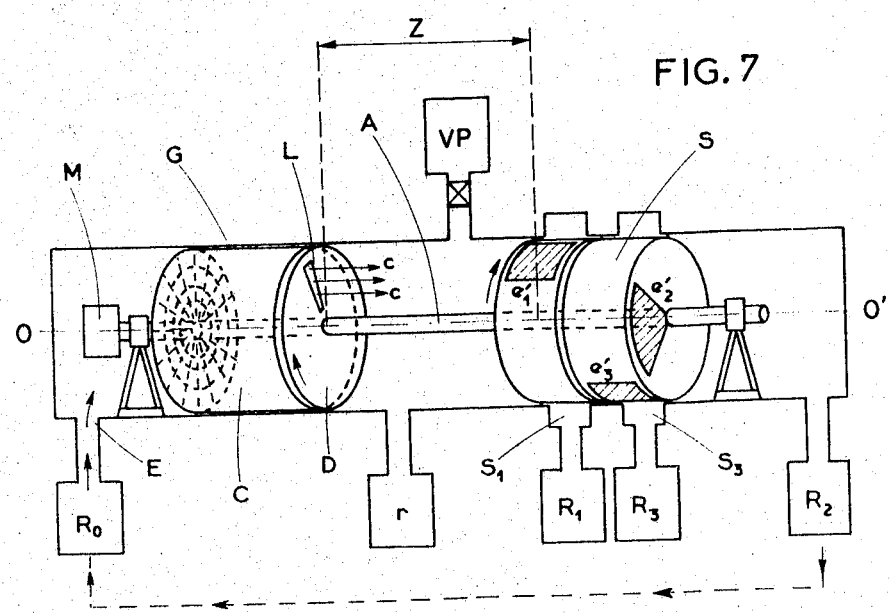

The process of the invention is the following:

The molecules to be separated being in a state of thermodynamic equilibrium, the process consists in trapping the molecules of the mixture whose thermal agitation translation speeds are based upon suitably selected values, or exceed a predetermined value.

This process takes advantage of Maxwell's laws of distribution of the translation speeds of the molecules constituting a binary mixture in thermodynamic equilibrium.

Assuming $M_1$ and $M_2$ ($M_2 > M_1$) to be the molecular weights of the considered molecules, at an absolute temperature $T$, and $n_1$ and $n_2$ the numbers of molecules of each species in the mixture, the curves $Y_1$ and $Y_2$ in FIGURE 1 represent, respectively, the relative numbers of molecules $$\delta n_1/n_1 \text{ and } \delta n_2/n_2$$

the translation speeds of which are comprised between the values $c$ and $c+\delta c$, on the ordinates are plotted the amounts: $\delta c =$ increment of the value of speed $c$  $\delta n_1 =$ the number of molecules of the first constituent, the translation speeds of which are comprised between $c$ and $c+\delta c$. $\delta n^2 =$ the number of molecules of the second constituent, the translation speeds of which are comprised between $c+\delta c$.

$$Y_1 = (\delta n_1)/(n_1 \delta c)$$

and $$Y_2 = (\delta n_2)/(n_2 \delta c)$$

and on the abscissae the translation speeds $c$. It should be noted that the curves $Y_1$ (full line) and $Y_2$ (dotted line) derive from the kinetic theory of gases and may be plotted, if required, for all cases of binary mixtures of molecules.

If molecules are trapped, the speeds of which are in an interval the lower limit of which $C$ and the upper limit $c+\delta c$, the ratio $$\delta n_1/\delta n_2$$

of the number of molecules is given by the following relation:

$$\frac{\delta n_1}{\delta n_2} = \frac{n_1}{n_2} \cdot \left(\frac{M_1}{M_2}\right)^{3/2} \cdot e^{\frac{M_2-M_1}{2RT} \cdot c^2}$$

where R designates the molecular constant of perfect gases.

The ratio $$\frac{Y_1}{Y_2} = \frac{\frac{\delta n_1}{\delta n_2}}{\frac{n_1}{n_2}}$$

which is the factor of enrichment in molecules of species 1 of the mixture ($\delta n_1, \delta n_2$) relative to the mixture ($n_1, n_2$) has the following value:

$$\left(\frac{M_1}{M_2}\right)^{3/2} \cdot e^{\frac{M_2-M_1}{2RT}c^2}$$

For values of $c$ lower than that corresponding to the intersection (point $b$) of curves $Y_1$ and $Y_2$, the enrichment factor is smaller than one; it is equal to one for the speed corresponding to the condition $Y_1 = Y_2$ and becomes greater than one (and gradually greater) for the higher values of $c$.

If, instead of dealing with a small speed range ($c$, $c+\delta c$), one considers the composition of the mixtures of molecules of species 1 and 2 the speeds of which exceed the value $c_i$ shown in FIGURE 1, the enrichment factor of the mixture of trapped molecules will be obtained by forming the ratio of the surface areas comprised between $Y_1$ and line $Oc$ curve $Y_2$ and line $Oc$, respectively, and the vertical line at the value $c_i$ of speed $c$, where $c_i$ is the speed for which the probability for the molecules of species 1 and 2 have the same translation speed.

The enrichment factor in molecules of species 1 will then be:

$$a = \frac{\int_{c_i}^{\infty} Y_1 dc}{\int_{c_i}^{\infty} Y_2 dc} \quad a = \frac{\int_{c_i}^{\infty} Y_1 dc}{\int_{c_i}^{\infty} Y_2 dc}$$

The enrichment factor $a$ may reach substantially higher values than those corresponding to the use of the phenomenon of diffusion through small orifices such as may be obtained through a porous wall. Thus, for a mixture of molecules the weights of which are closely adjacent as to their relative value, by selecting $$c_i = 2\sqrt{\frac{2RT}{M_2}}$$

i.e. twice the statistically most probable, speed of molecules $M_2$, and setting $\delta M/M = (M_2-M_1)/M$, where M is the mean value $(M_1+M_2)/2$, calculation shows that the enrichment factor obtained according to the invention is substantially:

$$a = 1 + 1/2(\delta M/M) \times 7.1$$

instead of $$a' = 1 + 1/2(\delta M/M)$$

provided by diffusion through small orifices. Factor $a$ increases moreover rapidly with increasing values of $c_i/c_p$, where $c_p$ is the value of the most probable average speed of the gaseous mixture.

It is thus possible to obtain mixtures depleted in molecules of species 1 by trapping the molecules the speeds of which are comprised between zero and a value lower than that corresponding, for instance, to intersection point $b$ of curves $Y_1$ and $Y_2$.

For the practical operation of the above described process, any device enabling to collect molecules the translation speeds of which are comprised between values determined as above explained.

For instance (FIG. 1), three ranges of speed values $c$ may be defined, comprised between the following limits:

$$\infty > c > c' \quad c' > c > c'' \quad c'' > c > 0$$

to which correspond the following enrichment factors:

$$a_1 = \frac{\int_{c'}^{\infty} Y_1 dc}{\int_{c'}^{\infty} Y_2 dc} \quad a_2 = \frac{\int_{c'}^{c''} Y_2 dc}{\int_{c'}^{c''} Y_1 dc}$$

$$a_3 = \frac{\int_0^{c''} Y_1 dc}{\int_0^{c''} Y_2 dc}$$

Selecting, for instance:

$$a_1 > 1 \quad a_2 = 1 \text{ and } a_3 < 1$$

then the intermediate mixture isolated, of the same composition as the initial mixture, may be added again to said initial mixture for a new treatment. Ultimately, the operation will result in isolating fraction enriched by a factor $a_1$ and a fraction depleted (in light molecules by factor $a_3$) without having any intermediate fractions.

For the practical selection of molecules according to the values of their thermal agitation translation speed, it may be desirable to use molecular jets propagating within an enclosure in which is established a sufficiently low pressure (of the order of $10^4$ mm. of Hg or lower) for the molecules to be reached a substantial free path with respect to the dimensions of the chamber in which the selection operation takes place.

If, for instance, a molecular jet is produced by means of a nozzle E (FIGURE 2) having a slot shaped opening F, rotating about an axis O perpendicular to the plane of the figure and parallel to the larger side of slot F, the molecules leaving nozzle E along a direction perpendicular to the axis of rotation will present translation speeds obeying Maxwell's Law of Distribution. When the nozzle rotates at an angular speed $\omega$ there will occur a scatering of the trajectories of the molecules in planes which are perpendicular to the plane of the figure.

With respect to a reference system integral with the rotating nozzle, the paths of the molecules from Archimedes spirals the equations of which, in polar coordinates (the origin being taken on the axis of rotatio) are:

$$\rho = c(\theta/\omega)$$

where $c$ designates the various values of the translation speeds of the molecules, $\omega$ the angular speed of rotation of the nozzle and $\theta$ the angle formed by the vector radius $\rho$ with the geometrical axis of the jet, the positive direction adopted for $\theta$ being opposed to that selected for $\omega$.

The spiral paths will be more curved as the translation speeds of the molecules are lower.

The paths on which the molecules have the higher speeds will be found in the vicinity of the geometrical axis OX of the jet (FIGURE 2). In the case where the molecular jet corresponds to a mixture of molecules of different weights, the said paths are occupied by a mixture which is richer in light molecules.

FIGURE 3 represents the plane distribution of the paths of the molecules (again in a reference system integral with the rotating nozzle) for a series of values of translation speeds.

The unit of speed selected for this representation is the most probable speed of one of the mixture constituents, for instance that having a molecular weight $M_1$, the said speed being expressed by the following relation:

$$c_{1p} = \sqrt{(2RT/M_1)}$$

In the figure, $x$ is the ratio $c/c_{1p}$ $$x = c/c_{1p}$$

It may be seen that it is possible to collect, by means of mobile trapping nozzles $T'$, $T''$ . . . , those molecules the speed values of which have values corresponding to the previously mentioned conditions. For molecular weights of the order of 300 to 400, and at room temperature, it is possible to obtain a fractionation ($a_1$) for $2 < x < \infty$, for instance, with an angular opening angle of the trapping nozzle equal to 20° of the arc, and a rotation speed of 6500 r.p.m., the distance of the trapping nozzle to the axis of rotation being about 15 centimeters.

The use of rotating molecular jets does not require the use of a rotary system such that the ejection speeds of the molecules in the jet are perpendicular to the axis of rotation. In order to reduce the high values of the rotation speeds (in the case of low molecular weights) necessary for a convenient operation of the device, an ejecting nozzle such as E (FIGURE 4) may be resorted to, whereby the direction M of the initial speeds forms an angle $\alpha$ with the axis of rotation OX.

Under these conditions, the trajectories (as plotted a reference system integral with the rotating nozzle) are situated on cones of revolution having a half apex angle $\alpha$. The projection of the said paths on a plane perpendicular to the axis of rotation (plotted and in the same system of reference) provides a family of Archimedes spirals corresponding to the equation:

$$\rho = c \sin \theta x(\theta/\omega)$$

The angular speeds $\omega$ necessary for the constructional data will then be reduced by the factor $\sin \theta$.

Another means for carrying out the general principles of the invention may be provided by molecular jets the cross-sections of which are defined by apertures formed in a rotating disc assembly.

FIGURE 5 illustrates such a disc D provided with an aperture L bounded by two closely adjacent radii. The gaseous molecules having a speed $c$ perpendicular to the plane of the disc move along a plane passing through the axis of the disc. They reach a plane P parallel to the plane of the disc and spaced by a distance Z, after a time interval $Z/c$.

Assuming that disc D rotates at speed $\omega$ about its axis, the various molecules reaching plane P will meet said plane along a straight line $O'\Delta'$ forming an angle $\alpha = \omega Z/c$ with line $O'\Delta$ in the plane parallel to the mean axis of aperture L. In other words, in the reference system integral with disc D and rotating at an angular speed $\omega$, the paths are located on surface families which constitute helices the pitch value $Z' = 2\pi(c/\omega)$ of which is the smaller as the speed $c$ is lower.

It is therefore possible to isolate the molecules the speeds of which are comprised between the infinite and $c'$ by trapping the same by means of a selector such as that shown in FIGURE 6.

Said selector S comprises a cylindrical drum the front plane wall is formed of a disc D' having its centre at $O'$. Said selector rotates integrally with disc D' about axis $OO'$.

Disc D' is formed with an aperture $e_1$ shaped as a segment of angle $\alpha_1 = \omega Z/c'$. To this aperture corresponds the factor $a_1(a_1 > 1')$.

A second aperture $e_2$ having an angle comprised between $\alpha_1 = \omega Z/c'$ and $\alpha_2 = \omega Z/c''$ traps the molecules having a speed comprised between $c'$ and $c''$, the enrichment factor $a_2$ of which is equal to 1.

Finally, the mixture having an enrichment factor $a_3$ 1 is trapped by a third aperture $e_3$ defined by angle $$\alpha_2 = \omega Z/c''$$

and an angle $\alpha_3$ sufficiently large to trap the major part of the slowest molecules.

A device for carrying out the process according to this latter method of separation and of trapping of the molecules is shown at FIGURE 7.

The device comprises a cylindrical enclosure G communicating with a container $R_0$ feeding an ejecting nozzle E and containers $R_1$, $R_2$ and $R_3$ adapted to receive the mixtures of molecules having the previously mentioned enrichment coefficients $a_1$, $a_2$ and $a_3$, respectively. Vacuum means V.P. communicates with enclosure G to maintain said enclosure under vacuum.

In the enclosure G is mounted a shaft A driven by a motor M and carrying the discs D and D' secured thereon, said disc D' being integral with the selector drum S shown in FIGURE 6 and hereinabove described. Apertures $e'_1$ and $e'_3$ of said selector open in annular chambers $S_1$ and $S_3$ communicating with containers $R_1$ and $R_3$, and aperture $e'_2$ opens in the back portion of enclosure G connected with container $R_2$.

Various precautions must be taken and arrangements made in order for the molecular jet forming mechanism to be satisfactory.

Thus, in order to avoid the molecules being bodily carried along by disc D in the space preceding said disc in the direction of movement of the molecules, it is advantageous to provide a stationary assembly of path-controlling ducts contained in a cylinder C (FIGURE 7) and defined by coaxial cylindrical surfaces (axis $OO'$) and by planes passing through the cylinder axis, the cross-sections of said tubes, which are of a fraction of a square centimeter, being small with respect to the length of the tube, for instance 10 to 20 cm. These path-controlling ducts are depicted in FIGURE 7 by the annular and intersecting radial dotted lines at the gas injecting end of cylinder C. It is to be understood that section walls project from these dotted lines thus forming elongated tubes through which the gas passes. The paths of the molecular jets are thus suitably controlled. Slot L may have the shape of a sector the angular opening of which is the greater as the angular speed of disc D is larger. Under these conditions, and by adjusting the distance Z between disc D and selector S, it is possible to provide angular openings $e_1$, $e_2$, $e_3$ of convenient values, even in the case of very fast molecular jets, without it being necessary to apply angular rotating speeds of excessive values.

On the other hand, and in order to reduce as much as possible the mechanical work necessary for the circulation of the molecules, it is advantageous to use feeding containers for the ejecting nozzle or for the trapping of molecules, brought to suitably selected temperatures.

It is therefore necessary to carry container $R_0$ to the temperature $T_0$, where $T_0$ is the temperature to which container RO is raised above the remaining portions of the device, in such a manner that the ejecting nozzle is fed at a suitable pressure (of the order of $10^{-3}$ mm. of Hg for the initial mixture) whereas the containers R, $R_2$, $R_3$ will be brought at temperatures lower than $T_0$ in order for the vapour tensions of the separated fractions to be considerably lower than to the pressure prevailing in enclosure G wherein the molecular jets are operating.

Under these conditions, it is not essential to provide pumps requiring a mechanical work adapted to circulate the gaseous mixtures. The only condition to be satisfied is the delivery and the removal of the suitable amounts of heat for maintaining the containers $R_0$, $R_1$, $R_2$, $R_3$ at suitable temperatures.

Satisfactory operating conditions exist if the free paths of the molecules are of the order of a few centimeters, resulting in pressure valves of the order of a few ten thousandths of mm. Hg. These values are given only by way of example and may be modified by any one skilled in the art, without departing from the spirit and scope of the invention as defined in the following claims.

What I claim is:

1. A process for separation, through fractionation, of a gaseous mixture of molecules of different weights and translation speeds in a state of thermodynamic equilibium comprising propelling said mixture as a gas jet through a defined mobile opening free of contact with a mobile surface, said gas jet being initially rectangularly shaped and rotated about an axis parallel to the longest dimension of said jet, whereby the action of the rotation effects a scattering of the outgoing gaseous mixture along planes perpendicular to said axis of rotation into enriched fractions, and separately trapping said fractions of the mixture directly from said gas jet.

2. A process according to claim 1, in which the axis of the jet of gaseous mixture is perpendicular to said axis of rotation.

3. A process according to claim 1, in which the axis of said gaseous mixture forms an angle with said axis of rotation.

4. A device for the continuous separation of molecules in a gaseous mixture, comprising a first rotary disc having at least one opening in its face defined by two closely adjacent radii, means for propelling the gaseous molecules perpendicularly through said opening towards a second rotary disc whose plane is parallel to the plane of said first disc and spaced coaxially a predetermined distance therefrom, said second rotary disc having a plurality of spaced openings in its face, the radial extremities of which are defined by radial sectors of said disc, and means to rotate said first and second discs.

5. A device for separating molecules from a gaseous mixture, comprising a container for said gaseous mixture, an elongated enclosure having cylindrical inner walls and two closed ends, means for maintaining said enclosure under vacuum, means for feeding at one end of said enclosure the gaseous mixture from said container, a shaft supported for rotation in said enclosure, coaxially with said cylindrical walls of said enclosure, means for rotating said shaft, and, spaced in succession from said one end of said enclosure, a first disc keyed on said shaft in a plane substantially perpendicular to said shaft, at least one substantially radial sector shaped slot in said first disc, a second disc keyed on said shaft, substantially parallel to said first disc, a plurality of sector-shaped openings in said second disc, each laterally limited by radii of said disc and having angular extents varying from one opening to another, a selector drum keyed on said shaft, adjacent said second disc, said selector drum comprising one terminal surface opening adjacent said second disc, a peripheral cylindrical wall and a terminal wall opposite said terminal opened surface, radial walls within said drum, extending from said terminal opened surface to said terminal wall in angular coincidence with said radii of said second disc limiting the openings in said second disc, and delimiting longitudinal ducts within said drum, at least one opening in said peripheral wall of said drum communicating with one of said ducts, and at least one sector shaped opening in the terminal wall of said drum communicating with another of said ducts, said openings having the same angular extent as said ducts, small peripheral clearances being provided between said first, and second disc and said drum, respectively, on the one hand, and said inner walls of said enclosure, on the other hand, an opening in the inner wall of said enclosure facing said lateral wall of said drum an opening near the other end of said enclosure and means connected with said openings, respectively, to withdraw gaseous molecules therethrough.

6. A device according to claim 5, in which a stationary guiding drum is arranged between the said one end of the enclosure and the said first disc, said guiding drum being formed of a plurality of circumferentially spaced walls extending substantially radially from the inner wall of the enclosure towards said shaft and a plurality of cylindrical shaped, radially spaced walls substantially coaxial with said shaft and intersecting said radial walls.

References Cited by the Examiner

UNITED STATES PATENTS

| | | | |
|---|---|---|---|
| 820,283 | 5/1906 | Clamond | 55—17 |
| 2,081,406 | 5/1937 | Mazza | 55—17 |
| 2,394,357 | 2/1946 | Beese | 55—17 |
| 2,657,802 | 11/1953 | Reed | 55—17 X |
| 2,950,778 | 8/1960 | Boettcher et al. | 55—17 |

REUBEN FRIEDMAN, *Primary Examiner.*

J. W. ADEE, *Assistant Examiner.*